United States Patent
Zhao et al.

(10) Patent No.: US 10,176,381 B2
(45) Date of Patent: Jan. 8, 2019

(54) VIDEO ANALYSIS SYSTEM FOR ENERGY-CONSUMING BUILDING EQUIPMENT AND INTELLIGENT BUILDING MANAGEMENT SYSTEM

(71) Applicant: Carrier Corporation, Farmington, CT (US)

(72) Inventors: Jianwei Zhao, Shanghai (CN); YuHui Kuang, Shanghai (CN); Robert Hong-Leung Chiang, Shanghai (CN)

(73) Assignee: CARRIER CORPORATION, Farmington, CT (US)

(*) Notice: Subject to any disclaimer, the term of this patent is extended or adjusted under 35 U.S.C. 154(b) by 94 days.

(21) Appl. No.: 15/307,132

(22) PCT Filed: Apr. 29, 2015

(86) PCT No.: PCT/US2015/028134
§ 371 (c)(1),
(2) Date: Oct. 27, 2016

(87) PCT Pub. No.: WO2015/168204
PCT Pub. Date: Nov. 5, 2015

(65) Prior Publication Data
US 2017/0046575 A1    Feb. 16, 2017

(30) Foreign Application Priority Data

Apr. 30, 2014 (CN) .......................... 2014 1 0179464

(51) Int. Cl.
*H04N 7/18* (2006.01)
*G06K 9/00* (2006.01)
(Continued)

(52) U.S. Cl.
CPC ........ *G06K 9/00744* (2013.01); *B66B 5/0012* (2013.01); *B66B 27/00* (2013.01);
(Continued)

(58) Field of Classification Search
CPC ............ G06K 9/00744; G06K 9/4604; G06K 9/00342; G06K 9/00778; F24F 11/30; F24F 2120/10; B66B 5/0012; B66B 27/00
(Continued)

(56) References Cited

U.S. PATENT DOCUMENTS 5,298,697 A    3/1994   Suzuki et al.
7,139,409 B2   11/2006  Paragios et al.
(Continued)

FOREIGN PATENT DOCUMENTS

CN    101188743 A    5/2008
CN    101607668 A    12/2009
(Continued)

OTHER PUBLICATIONS

International Search Report and Written Opinion for application PCT/US2015/028134, dated Jun. 17, 2015, 10 pages.
(Continued)

*Primary Examiner* — Allen C Wong
(74) *Attorney, Agent, or Firm* — Cantor Colburn LLP

(57) ABSTRACT

The present invention relates to a video analysis system for an energy-consuming building equipment. The video analysis system includes a camera and an image processing unit to monitor people who appear in a target region, and in an actual space where the camera coexists with the energy-consuming building equipment, a height from the camera to a bottom surface of the actual space ranges from 2 to 10 meters. The present invention further relates to an intelligent building management system provided with the video analysis system for the energy-consuming building equipment. With the video analysis system of the present invention, a security system of a building is combined with the energy-consuming building equipment by means of an optimal camera design/arrangement, which can improve the opera- (Continued)

tion efficiency of the whole building significantly and achieve a desirable energy-saving effect.

13 Claims, 1 Drawing Sheet

(51) Int. Cl.
  *F24F 11/30* (2018.01)
  *B66B 5/00* (2006.01)
  *B66B 27/00* (2006.01)
  *G06K 9/46* (2006.01)
(52) U.S. Cl.
  CPC .......... *F24F 11/30* (2018.01); *G06K 9/00342* (2013.01); *G06K 9/00778* (2013.01); *G06K 9/4604* (2013.01)
(58) Field of Classification Search
  USPC ............................................................. 348/143
  See application file for complete search history.

(56) References Cited

U.S. PATENT DOCUMENTS

| | | | |
|---|---|---|---|
| 8,116,564 B2 | 2/2012 | Kilambi et al. | |
| 8,195,598 B2 | 6/2012 | Hu et al. | |
| 8,351,647 B2 | 1/2013 | Sharma et al. | |
| 8,600,102 B1* | 12/2013 | Frome | G09F 9/30 382/100 |
| 2005/0088520 A1 | 4/2005 | Wiesinger et al. | |
| 2008/0259159 A1* | 10/2008 | Nystrom | H04N 5/232 348/143 |
| 2009/0034793 A1 | 2/2009 | Dong et al. | |
| 2010/0162285 A1* | 6/2010 | Cohen | H04H 60/31 725/12 |
| 2010/0322516 A1 | 12/2010 | Xu et al. | |
| 2011/0268321 A1 | 11/2011 | Hosoi | |
| 2011/0310220 A1* | 12/2011 | McEldowney | G02B 5/1895 348/42 |
| 2012/0020518 A1* | 1/2012 | Taguchi | G06T 7/292 382/103 |
| 2012/0062749 A1 | 3/2012 | Kawahata | |
| 2013/0113932 A1 | 5/2013 | Lipton et al. | |
| 2013/0182905 A1 | 7/2013 | Myers et al. | |
| 2013/0329960 A1 | 12/2013 | Sandahl et al. | |
| 2014/0037262 A1 | 2/2014 | Sako et al. | |
| 2014/0072170 A1 | 3/2014 | Zhang et al. | |
| 2016/0272467 A1* | 9/2016 | Ghadamossoltani | B66B 25/006 |

FOREIGN PATENT DOCUMENTS

| | | |
|---|---|---|
| CN | 101739569 A | 6/2010 |
| CN | 201590866 U | 9/2010 |
| CN | 102126653 A | 7/2011 |
| CN | 102509151 A | 6/2012 |
| CN | 102799863 A | 11/2012 |
| CN | 102830713 A | 12/2012 |
| CN | 102982341 A | 3/2013 |
| CN | 102982598 A | 3/2013 |
| CN | 202929726 U | 5/2013 |
| CN | 103164711 A | 6/2013 |
| CN | 103218816 A | 7/2013 |
| CN | 103258232 A | 8/2013 |
| CN | 103310444 A | 9/2013 |
| CN | 103489012 A | 1/2014 |
| WO | 03088157 A1 | 10/2003 |
| WO | 2007081345 A1 | 7/2007 |
| WO | 2007139658 A2 | 12/2007 |

OTHER PUBLICATIONS

European Office Action for application EP 15721505.4, dated Feb. 20, 2018, 5 pages.
Jaynes, Christopher et al., "The Terrascope DatasetL Scripted Multi-Camera Indoor Video Surveillance with Ground-truth", 2nd Joint IEEE International Workshop on VS-PETS, Beijing, Oct. 15-16, 2005, 309-316 pages.

* cited by examiner

VIDEO ANALYSIS SYSTEM FOR ENERGY-CONSUMING BUILDING EQUIPMENT AND INTELLIGENT BUILDING MANAGEMENT SYSTEM

TECHNICAL FIELD

The present invention relates to a video analysis system for an energy-consuming building equipment, and an intelligent building management system configured with the video analysis system.

RELATED ART

The US Patent Application No. US20100322516A published by Li-Qun Xu et al. provides a crowd congestion analysis method. This patent discloses a method and system for analyzing crowd congestion in actual spaces, in which a video image is used to determine a region of interest in a space and the region of interest is partitioned into an irregular array of sub-regions, each congestion contributor being assigned to a sub-region. Then, the first and second spatial-temporal visual features are determined, and metrics are computed so that the measure of dynamic or static congestion of each sub-region is characterized.

The US Patent Application No. US20130113932 that Alan J. Liption et al. transferred to Object Video, Inc. provides a video imagery-based sensor. This patent discloses a sensing device, which includes: a video imager to acquire a video; a processing unit to receive and process the video from the video imager; and a communication channel to output a non-imagery signal.

The U.S. Pat. No. 8,195,598 that Chen Xiangrong et al. transferred to Agilence, Inc. provides a method and system for hierarchical human/crowd behavioral detection. This patent discloses a computer automated method of selectively identifying user specific behaviors of a crowd. The method includes receiving video data, and can also include receiving audio data and sensor data. The video data contains images of a crowd. The video data is processed to extract hierarchical human and crowd features. The detected crowd features are processed to detect a selectable crowd behavior. The selected crowd behavior is specified by a configurable behavior rule. Human detection is set by using a hybrid human detection algorithm, which includes Adaboost or convolutional neural network. The text analysis technology is used to detect crowd features. The configurable crowd behavior for detection is defined by a crowd behavior description language.

The US Patent Application No. US2005088520 that WIESINGER JOSEF et al. transferred to INVENTIO AG provides a video camera monitoring of escalators and/or moving walks. The patent discloses a monitoring system for the detection of obstacles and persons on escalators and/or moving walks, which includes at least one video camera, wherein stereoscopic images can be acquired by using this monitoring system.

The US Patent Application No. US2011268321 that HOSOI TOSHINORI transferred to NEC CORPORATION provides a person-judging device, method, and program. This patent discloses a person-judging device, including: an obstruction storage which stores information indicating an area of an obstruction which is extracted from an image based on a video signal from an external camera, the obstruction being extracted from the image; head portion range calculation means which, when a portion of an object extracted from the image is hidden by the obstruction, assumes that a potential range of grounding points where the object touches a reference face on the image is the area of the obstruction which is stored in the obstruction storage, and which, based on the assumed range and the correlation between the height of a person and the size and position of the head portion that are previously provided, calculates the potential range of the head portion on the image by assuming that a portion farthest from the grounding points of the object is the head portion of the person; and head portion detection means that judges if an area including a shape corresponding to the head portion exists in the range of the head portion calculated by the head portion range calculation means.

However, none of the afore-mentioned methods and systems related to video analysis discloses how to arrange and install cameras to help energy-consuming facilities in a building achieve optimal operation efficiency, for example, help achieve highest elevator scheduling efficiency or detect an accident rate of an escalator as far as possible, and to minimize energy consumption. Therefore, how to install and arrange cameras to achieve an optimal effect of a video analysis algorithm so that the overall operation efficiency of an intelligent building achieves the highest level is the problem to be solved by the present invention.

SUMMARY

Accordingly, according to a first aspect of the present invention, it provides a video analysis system for an energy-consuming building equipment, thereby effectively solving the afore-mentioned problem in the prior art and problems in other aspects. In the video analysis system for the energy-consuming building equipment according to the present invention, the video analysis system includes a camera and an image processing unit to monitor people who appear in a target region, and in an actual space where the camera coexists with the energy-consuming building equipment, a height from the camera to a bottom surface of the actual space ranges from 2 to 10 meters.

In an implementation of the video analysis system according to the present invention, the energy-consuming building equipment is an elevator, and an angle between a lens of the camera and a horizontal plane ranges from 15 to 90 degrees.

In another implementation of the video analysis system according to the present invention, the energy-consuming building equipment is an escalator, a height from the camera to an upper bottom surface of the escalator in the actual space ranges from 2 to 10 meters, and an angle between a lens of the camera and a horizontal plane ranges from 30 to 90 degrees.

In further another implementation of the video analysis system according to the present invention, the energy-consuming building equipment is an escalator, a height from the camera to a lower bottom surface of the escalator in the actual space ranges from 2 to 10 meters, and an angle between a lens of the camera and a horizontal plane ranges from −60 to 60 degrees.

In yet another implementation of the video analysis system according to the present invention, an area of the target region ranges from 5 to 200 square meters.

In still another implementation of the video analysis system according to the present invention, the energy-consuming building equipment is an air conditioning system.

In addition, according to a second aspect of the present invention, it also provides an intelligent building management system, wherein the intelligent building management system is configured with the video analysis system described above, the intelligent building management system includes a controller, the controller has a control module and a number of people calculation module to maintain a communication with the image processing unit, if the energy-consuming building equipment is an elevator, the number of people calculation module receives video data from the image processing unit and calculates an actual number of people in the target region, and the control module instructs the elevator to stop at a floor where the actual number of people in the target region is greater than or equal to one.

In an implementation of the intelligent building management system according to the present invention, when the number of the elevators are more than two, the controller further includes a crowd density detection module, wherein the crowd density detection module receives the video data from the image processing unit and acquires a density level, and the control module adjusts a sequence of the floors where the elevator stops or the number of elevators in operation according to the density level.

In another implementation of the intelligent building management system according to the present invention, the control module maintains a communication with an air conditioner control unit of an air conditioning system in the target region, so that the control module instructs an air conditioner in the target region to turn on or turn off or adjusts an air volume of the air conditioner according to the actual number of people.

In addition, according to a third aspect of the present invention, it also provides an intelligent building management system, wherein the intelligent building management system is configured with the video analysis system described above, the intelligent building management system includes a controller, the controller has a control module, an abnormal behavior detection module and an alarm module to maintain a communication with the image processing unit, if the energy-consuming building equipment is an escalator, the abnormal behavior detection module receives video data from the image processing unit and detects human behaviors, and if an abnormal situation going against normal human behaviors occurs, the control module sends an alarm signal to the alarm module.

In an implementation of the intelligent building management system according to the present invention, the abnormal behavior detection module further includes a tumble detection unit to receive the video data from the image processing unit and detect a human tumble behavior, and if there exists a human tumble behavior, the control module sends an alarm signal to the alarm module.

In another implementation of the intelligent building management system according to the present invention, the abnormal behavior detection module further includes a congestion detection unit to receive the video data from the image processing unit and detect a congestion level, and if the congestion level exceeds a preset value, the control module sends an alarm signal to the alarm module.

In further another intelligent building management system according to the present invention, the control module maintains a communication with an air conditioner control unit of an air conditioning system in the target region, and the controller further includes a number of people calculation module to receive the video data from the image processing unit and calculate an actual number of people in the target region, so that the control module instructs an air conditioner in the target region to turn on or turn off or adjusts an air volume of the air conditioner according to the actual number of people.

Furthermore, according to a fourth aspect of the present invention, it also provides an intelligent building management system, wherein the intelligent building management system is configured with the video analysis system described above, the intelligent building management system includes a controller, the controller has a control module and a number of people calculation module to maintain a communication with the image processing unit, if the energy-consuming building equipment is an air conditioning system, the control module further maintains a communication with an air conditioner control unit of the air conditioning system in the target region, and the number of people calculation module receives video data from the image processing unit and calculates an actual number of people in the target region, so that the control module instructs an air conditioner in the target region to turn on or turn off or adjusts an air volume of the air conditioner according to the actual number of people.

Those skilled in the art can easily understand that, although not fully enumerated in the present invention, reasonable combinations of the foregoing technical solutions should also belong to the essence of the present invention and fall within the protection scope of the present invention.

The technical solutions provided by the present invention have the following beneficial effects: as compared with the prior art, the video analysis system for the energy-consuming building equipment according to the present invention can utilize an existing security system effectively to improve the operation efficiency of the energy-consuming building equipment. Further, energy consumption can be reduced easily. Further, the whole building becomes more intelligent.

BRIEF DESCRIPTION OF THE DRAWINGS

The technical solution of the present invention is further described in detail below with reference to the accompanying drawings and embodiments, wherein.

DETAILED DESCRIPTION

The embodiments of the present invention are described in detail below with reference to the accompanying drawings. First, it should be noted that, the directional terms such as upper, lower, left, right, front, rear, top, and bottom that are mentioned or may be mentioned in the specification are defined with respect to the structure in each accompanying drawing, and they are relative concepts, and therefore, may vary correspondingly according to the different positions or different usage states thereof. Therefore, these or other directional terms should not be interpreted as limiting terms.

Figure 1:
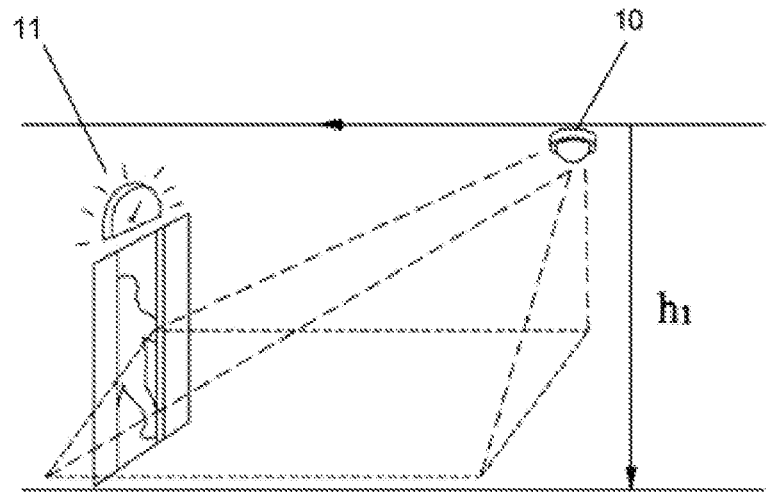
FIG. 1 is a schematic structural diagram of an embodiment of a video analysis system for an energy-consuming building equipment of the present invention when the energy-consuming building equipment is an elevator.

The present invention provides a video analysis system for an energy-consuming building equipment, wherein the energy-consuming building equipment herein refers to common equipment such as an air conditioning system, an elevator system, an escalator system or other systems in public buildings such as a shopping mall, a high-rise office building, and a hotel. In the embodiments of the present invention, the video analysis system for the energy-consuming building equipment belongs to a security system of a building, and includes a camera and an image processing building that receives and processes video data from the camera. As shown in FIG. 1, the camera 10 may be a common security camera in an ordinary building, and a substantially columnar lens (not shown) is disposed in the camera 10. It can be understood that, the camera can monitor, in real time, people who appear in a target region in an actual space where the camera coexists with the energy-consuming building equipment. To achieve high performance of the video analysis system, a height from the camera to a bottom surface of the actual space may be designed in a range from 2 to 10 meters.

Refer to FIG. 1, which schematically shows the arrangement of the camera when the energy-consuming building equipment is an elevator. It can be seen clearly in the figure that, the height from the camera 10 to the bottom of the elevator 11 is marked as $h_1$, and the height $h_1$ may range from 2 to 10 meters. Furthermore, an angle between the lens of the camera 10 and a horizontal plane may range from 15 to 90 degrees. Preferably, an area of the target region covered by the lens of the camera 10 ranges from 5 to 200 square meters. It should be noted that, the target region covered by the lens of the camera 10 is schematically drawn with dotted lines in FIG. 1.

Figure 2:
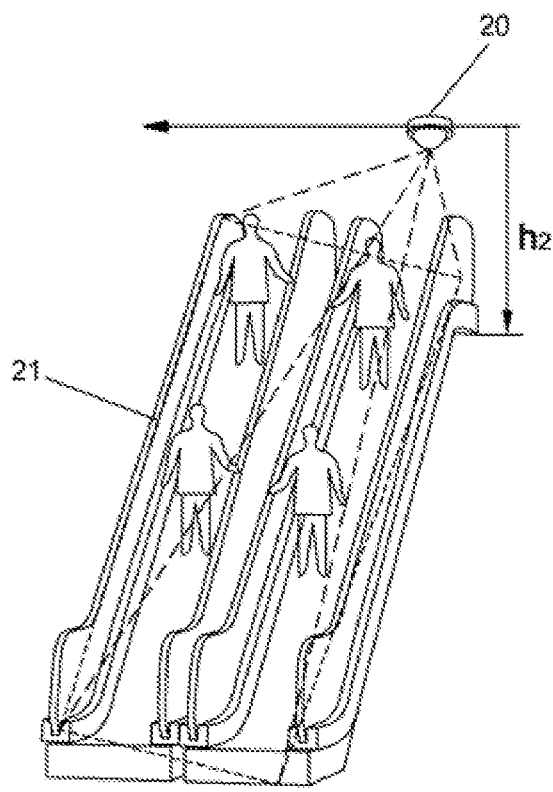
FIG. 2 is a schematic structural diagram of an embodiment of a video analysis system for an energy-consuming building equipment of the present invention when the energy-consuming building equipment is an escalator.

It can be understood that, similarly, FIG. 2 schematically shows the arrangement of the camera when the energy-consuming building equipment is an escalator. It can be seen clearly in the figure that, a height from the camera 20 to an upper bottom surface of the escalator 21 (namely, the highest position where a passenger on the escalator can stand) is marked as $h_2$, and the height $h_2$ may range from 2 to 10 meters. In addition, an angle between the lens of the camera 20 and a horizontal plane may range from 30 to 90 degrees. Preferably, an area of the target region covered by the lens of the camera 20 ranges from 5 to 200 square meters. It should be noted that, the target region covered by the lens of the camera 20 is schematically drawn with dotted lines in FIG. 2. As is known to all, an escalator is an inclined step conveyer apparatus that connects at least two floors, and the embodiment with reference to FIG. 2 only describes a situation where the camera is installed above the top of the escalator and the lens of the camera monitors people on the escalator from the top to the bottom. In another optional situation, if the camera is installed near an interval between floors at the middle of the escalator, the lens of the camera may monitor people on the escalator from the bottom to the top, wherein a height from the camera to a lower bottom surface of the escalator (that is, the lowest position where a passenger on the escalator can stand) in the actual space may range from 2 to 10 meters, and an angle between the lens of the camera and a horizontal plane may range from −60 to 60 degrees. Preferably, an area of the target region covered by the lens of the camera ranges from 5 to 200 square meters.

Further, based on the video analysis system described above, the present invention provides an intelligent building management system, wherein the intelligent building management system is configured with the afore-mentioned video analysis system for the energy-consuming building equipment. If the energy-consuming building equipment is an elevator, the target region of the camera can cover the area of a waiting region of the elevator, as shown in FIG. 1. The unique feature of the conception of the present invention is that a security system and an elevator system are combined advantageously without adding any additional component or additional configuration, to improve the overall operation efficiency of the intelligent building management system; meanwhile, with the optimized arrangement form of the camera, the elevator system of the building management system achieves an optimal operation efficiency. The intelligent building management system includes a controller, the controller is provided with a control module and a number of people calculation module to maintain a communication with the image processing unit of the camera, wherein, the number of people calculation module receives video data from the image processing unit of the camera, and carries out a video analysis after the collection to calculate an actual number of people in the target region; if the actual number of people is greater than or equal to one, it indicates that there is a passenger waiting to take the elevator in the waiting region in front of the elevator, and at this time, the control module instructs the elevator to stop at a floor where the actual number of people in the target region is greater than or equal to one. In other words, when a passenger waits for the elevator in a hall or an elevator waiting region, the intelligent building management system can schedule the elevator automatically in a highly efficient manner according to the information provided by the video analysis system, so that the passenger does not need to press the elevator button and passively wait for the elevator to stop, which thus brings comfortable experience for the passengers taking the elevator.

In other embodiments based on the foregoing embodiment, to further improve the operation efficiency of the elevator, especially, in a case where the number of elevators is more than two, the controller may further include a crowd density detection module, wherein the crowd density detection module receives the video data from the image processing unit of the camera and acquires a density level, and according to the density level, the control module adjusts a sequence of the floors where the elevator stops, for example, the elevator is firstly scheduled to a floor where a number of people are waiting in the elevator waiting region; or the number of elevators in operation, namely, the control module schedules as few elevators as possible when only few passengers are waiting to achieve the purpose of high-efficiency and energy-saving.

As a preferable situation, the intelligent building management system may be combined with an air conditioning system in the building, for example, the controller of the intelligent building management system may maintain a communication with the air conditioning system in the target region, so that the control module can instruct, according to the actual number of people in the target region, an air conditioner at a target floor to turn on if there are people at the target floor and turn off if there are no people, and the air conditioner no longer needs to be turned on or off manually, which makes the control of the air conditioning system more automatic; in addition, the control module of the controller may adjust an air volume of the air conditioner dynamically according to the actual number of people in the target region, for example, increase the air volume of the air conditioner if there are many people, and decrease the air volume of the air conditioner if there are few people, thereby achieving the energy-saving effect. In a word, by connecting the intelligent building management system with the elevator system or air conditioning system in the building, different devices can call the video analysis method at the same time to acquire different information, thereby achieving the overall energy-saving management of the building.

Apart from that, based on the video analysis system described above, the present invention provides another intelligent building management system, wherein the intelligent building management system is configured with the afore-mentioned video analysis system for the energy-consuming building equipment. If the energy-consuming building equipment is an escalator, the target region of the camera can cover the area of a step region or a passenger conveying region of the escalator, as shown in FIG. 2. The unique feature of the conception of the present invention is that a security system and an escalator system are combined advantageously without adding any additional component or additional configuration, to improve the overall operation efficiency of the intelligent building management system; meanwhile, with the optimized arrangement form of the camera, the escalator system of the building management system achieves an optimal operation efficiency. The intelligent building management system includes a controller, the controller is provided with a control module, an abnormal behavior detection module, and an alarm module to maintain a communication with the image processing unit, wherein, the abnormal behavior detection module receives video data from the image processing unit of the camera and detects human behaviors, and if an abnormal situation going against normal human behaviors occurs, for example, a passenger falls over or goes on the wrong side on the escalator, the control module sends an alarm signal to the alarm module to draw the attention of security personnel to reduce the accident rate effectively.

Those skilled in the art can realize that, the abnormal behavior detection module may further include a tumble detection unit to receive the video data from the image processing unit of the camera and detect a human tumble behavior, and if there exists a human tumble behavior, the control module sends an alarm signal to the alarm module to draw the attention of security personnel; or the abnormal behavior detection module may further include a congestion detection unit to receive the video data from the image processing unit of the camera and detect a congestion level, and if the congestion level exceeds a preset value, the control module also sends an alarm signal to the alarm module to draw the attention of security personnel. It should be noted that, the foregoing tumble detection unit or congestion detection unit is configured by a user selectively according to an actual need; for the purpose of cost saving or other purposes, the abnormal behavior detection module may include the tumble detection unit only, or include the congestion detection unit only.

As an example, in the foregoing embodiment, the controller module of the controller of the intelligent building management system may further maintain a communication with an air conditioner control unit of an air conditioning system in the target region, and the controller further includes a number of people calculation module, wherein, the number of people calculation module receives the video data from the image processing unit of the camera and calculates an actual number of people in the target region, so that according to the actual number of people in the target region, the control module instructs an air conditioner in the target region to turn on if there are people in the target region or turn off if there are no people, or adjusts an air volume of the air conditioner dynamically, for example, increases the air volume of the air conditioner if there are many people and decreases the air volume of the air conditioner if there are few people, thereby achieving the energy-saving effect.

Apart from that, based on the video analysis system described above, the present invention provides another intelligent building management system, wherein the intelligent building management system is configured with the afore-mentioned video analysis system for the energy-consuming building equipment. If the energy-consuming building equipment is an air conditioning system, the target region of the camera may be associated with the air conditioning system used for controlling the temperature, humidity, cleanliness, and air velocity of the air in the target region. The unique feature of the conception of the present invention is that a security system and an air conditioning system are combined advantageously without adding any additional component or additional configuration, to reduce the energy consumption level of the building; meanwhile, with the optimized arrangement form of the camera, the energy consumption of the air conditioning system of the building management system is reduced to a lowest level. The intelligent building management system includes a controller, the controller is provided with a control module and a number of people calculation module to maintain a communication with the image processing unit, wherein the control module further maintains a communication with an air conditioner control unit of the air conditioning system in the target region, and the number of people calculation module receives video data from the image processing unit and computes an actual number of people in the target region, so that the control module instructs an air conditioner in the target region to turn on or turn off or adjusts an air volume of the air conditioner according to the actual number of people, which is beneficial to the energy saving and emission reduction.

The test proves that the video analysis system for the energy-consuming building equipment according to the present invention can improve the operation efficiency of the whole building significantly by means of an optimized design/arrangement of the camera without adding any additional auxiliary device, and on the other hand, also brings a wonderful feeling and comfortable experience to those using the energy-consuming building equipment. Moreover, when the video analysis system is combined with the energy-consuming building equipment, a highly efficient, easy-to-use, and reliable intelligent building management means is provided, which improves the controllability of the intelligent building management; the energy consumption and security conditions of the building can be acquired precisely, and the power consumption of the building can be managed in a refined manner, so that the energy consumption of the public building is managed in a more intelligent manner, thus effectively reducing the energy consumption while significantly improving the operation efficiency of the whole building.

Considering the afore-mentioned advantages of the video analysis system for the energy-consuming building equipment according to the present invention, it is suggested that the area covered by the camera, the installation angle of the camera, and the height of the camera be generalized to different floors, especially floors having high requirements on energy-consuming building equipment, so as to facilitate the energy-saving and emission reduction and achieve optimal operation efficiency of the whole building. In short, the intelligent building management system configured with the video analysis system cannot only improve the operation efficiency of the elevator significantly, detect the abnormality on the escalator, and reduce the accident rate effectively, but also can help the air conditioning system save energy, and therefore is worth being generalized in high-rise buildings such as large business buildings.

Several specific embodiments are listed above to elaborate the video analysis system for energy-consuming building equipment and the intelligent building management system according the present invention, and these examples are merely used for the description of the principle of the present invention and the implementation manner thereof, but are not intended to limit the present invention. Those of ordinary skill in the art can further make various variations and improvements without departing from the spirit and scope of the present invention. In addition, in some application scenarios or according to an actual requirement, it is acceptable to make different modifications to the configuration of the video analysis system on each branch of a system of energy-consuming building equipment. Therefore, all the equivalent technical solutions should belong to the scope of the present invention and be subject to the claims of the present invention.

What is claimed is:

1. An intelligent building management system, wherein, the intelligent building management system is configured with a video analysis system for an energy-consuming building equipment, the video analysis system comprising a camera and an image processing unit to monitor people who appear in a target region, wherein, in an actual space where the camera coexists with the energy-consuming building equipment,
wherein the intelligent building management system comprises a controller, the controller has a control module and a number of people calculation module to maintain a communication with the image processing unit, when the energy-consuming building equipment is an elevator, the number of people calculation module receives video data from the image processing unit and calculate an actual number of people in the target region, and the control module instructs the elevator to stop at a floor where the actual number of people in the target region is greater than or equal to one.

2. The intelligent building management system of claim 1, wherein, the energy-consuming building equipment is an elevator, and an angle between a lens of the camera and a horizontal plane ranges from 15 to 90 degrees.

3. The intelligent building management system of claim 1, wherein, the energy-consuming building equipment is an escalator, a height from the camera to an upper bottom surface of the escalator in the actual space ranges from 2 to 10 meters, and an angle between a lens of the camera and a horizontal plane ranges from 30 to 90 degrees.

4. The intelligent building management system of claim 1, wherein, the energy-consuming building equipment is an escalator, a height from the camera to a lower bottom surface of the escalator in the actual space ranges from 2 to 10 meters, and an angle between a lens of the camera and a horizontal plane ranges from −60 to 60 degrees.

5. The intelligent building management system of claim 1, wherein, an area of the target region ranges from 5 to 200 square meters.

6. The intelligent building management system of claim 1, wherein, the energy-consuming building equipment is an air conditioning system.

7. The intelligent building management system of claim 1, wherein, when the number of the elevators is more than two, the controller further comprises a crowd density detection module, wherein the crowd density detection module receives the video data from the image processing unit and acquires a density level, and the control module adjusts a sequence of the floors where the elevator stops or the number of the elevators in operation according to the density level.

8. The intelligent building management system of claim 1, wherein, the control module maintains a communication with an air conditioner control unit of an air conditioning system in the target region, so that the control module instructs an air conditioner in the target region to turn on or turn off or adjusts an air volume of the air conditioner according to the actual number of people.

9. An intelligent building management system, wherein, the intelligent building management system is configured with the video analysis system of claim 1, the intelligent building management system comprises a controller, the controller has a control module, an abnormal behavior detection module and an alarm module to maintain a communication with the image processing unit, when the energy-consuming building equipment is an escalator, the abnormal behavior detection module receives video data from the image processing unit and detects human behaviors, and if when an abnormal situation going against normal human behaviors occurs, the control module sends an alarm signal to the alarm module.

10. The intelligent building management system of claim 9, wherein, the abnormal behavior detection module further comprises a tumble detection unit to receive the video data from the image processing unit and detect a human tumble behavior, and when there exists a human tumble behavior, the control module sends an alarm signal to the alarm module.

11. The intelligent building management system of claim 9, wherein, the abnormal behavior detection module further comprises a congestion detection unit to receive the video data from the image processing unit and detect a congestion level, and when the congestion level exceeds a preset value, the control module sends an alarm signal to the alarm module.

12. The intelligent building management system of claim 9, wherein, the control module maintains a communication with an air conditioner control unit of an air conditioning system in the target region, and the controller further comprises a number of people calculation module to receive the video data from the image processing unit and calculate an actual number of people in the target region, so that the control module instructs an air conditioner in the target region to turn on or turn off or adjusts an air volume of the air conditioner according to the actual number of people.

13. The intelligent building management system of claim 1, wherein a height from the camera to a bottom surface of the actual space ranges from 2 to 10 meters.

* * * * *